(No Model.)
L. F. BROUS.
LOOM TEMPLE.
No. 464,214. Patented Dec. 1, 1891.
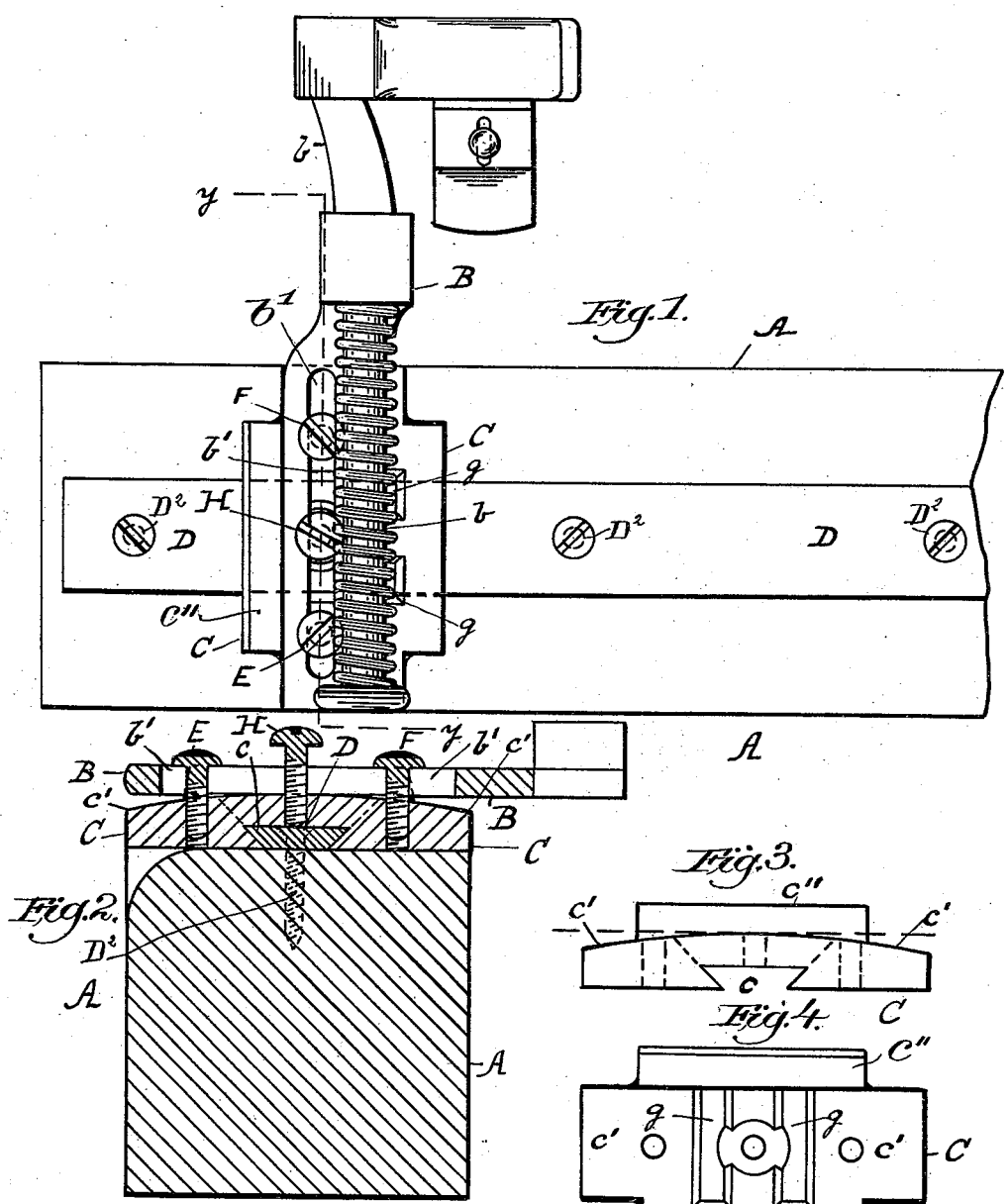

UNITED STATES PATENT OFFICE.

LEWIS F. BROUS, OF PHILADELPHIA, PENNSYLVANIA, ASSIGNOR TO THE DUTCHER TEMPLE COMPANY, OF HOPEDALE, MASSACHUSETTS.

LOOM-TEMPLE.

SPECIFICATION forming part of Letters Patent No. 464,214, dated December 1, 1891.

Application filed June 8, 1891. Serial No. 395,522. (No model.)

*To all whom it may concern:*

Be it known that I, LEWIS F. BROUS, of Philadelphia, (Frankford,) county of Philadelphia, State of Pennsylvania, have invented an Improvement in Loom-Temples, of which the following description, in connection with the accompanying drawings, is a specification, like letters on the drawings representing like parts.

This invention in loom-temples has more especial reference to means for supporting and adjusting the temple upon the breast-beam in order that the temple-roll and its co-operating parts may be readily adjusted in position to the cloth-line, both as to width and to its relation to the race-board of the lay and the reed, it being understood that the warps in the reed are somewhat differently located owing to the different class of goods being woven. The temple in this my invention is therefore capable of being adjusted laterally, longitudinally, and vertically; and to effect these adjustments quickly and accurately I have provided the breast-beam with a guide-plate preferably dovetailed or beveled in cross-section and extended more or less across the width of the loom, and upon this guide-plate I have mounted in an adjustable manner a fulcrum block or stand, it having, as represented, a convex face or top upon which the temple-bar is mounted, so that it may be tipped in the direction of its length.

In this present illustration of my invention I have selected for use a temple of the class known as the "Dutcher;" but it is obvious that any usual or suitable temple-bar might be mounted upon the said block.

Figure 1 of the drawings is a top or plan view showing a temple mounted, in accordance with my invention, upon a part of the breast-beam. Fig. 2 is a transverse section in line $y$ $y$ of Fig. 1. Fig. 3 is an edge view of the fulcrum-block. Fig. 4 is a top or plan view of the same.

The breast-beam A is and may be as common in looms. Upon the top of the breast-beam in this instance of my invention I have mounted a guide-plate D, it being herein represented as dovetailed in cross-section; but instead it might be of any other usual shape to serve the purpose of a guide and retain upon it the fulcrum-block C, which has a groove of corresponding shape. In practice this guide-plate may be in one or two pieces—that is, a guide-plate may be attached to the breast-beam near each side of the loom, or the guide-plate may be long enough to extend entirely across the breast-beam. The guide-plate D is represented as attached to the breast-beam by screws $D^2$, Fig. 2 showing one of said screws by dotted lines, the heads of the said screws being countersunk into the said guide-plate. The surface $c'$ of the fulcrum-block C is convex, as best represented in Fig. 2, and the said block has a guide projection $c''$.

In the drawings, B represents the temple-stand having suitable bearings in which the shank of the temple slides, the temple-head and the roll (not shown) being of any usual or suitable construction, as is also the spring $g$, surrounding the said shank.

The stand B has a slot $b'$, through which are extended suitable adjusting-screws E F, the said screws being screwed into the fulcrum-block C, a clamp-screw H, also extended through said slot and screwed into the fulcrum-block, acting upon the top of the guide-plate D to confine the fulcrum-block in adjusted position with relation to the width of the loom. The slot $b'$ permits the stand B to be adjusted longitudinally, the guide $c''$ acting to align the bar and keep it in proper straight line.

To adjust the temple-head vertically to the cloth-line, the operator will turn the clamp-screws E F, causing one to ascend and the other to descend, as will be readily understood, according as it is desired to raise or lower the front end of the stand and consequently the temple-head.

It will be noticed in this my invention by the adjusting-screws E F alone, and owing to the convex face or top of the fulcrum-block C and the straight under side of the stand B, that when the stand is adjusted by vertical movement of the screws E F the temple-head moves in the arc of a circle measured from the top of the fulcrum-block, and when being adjusted vertically the temple-head has no forward movement; but, on the contrary, the longitudinal adjustment of the temple is gained entirely by a straight or longitudinal movement of the stand upon the fulcrum-block. In this way finer and more accurate adjustments to the cloth being woven may be gained than should, for instance, the under side of the stand be made concaved to fit the convex face of the fulcrum-block. Further, by putting the stand directly upon the face of the fulcrum-block the greatest possible compactness of parts is insured and cheapness of construction is gained, for it will be obvious that the more nearly in line with the top of the breast-beam the temple the nearer the temple-head in operative position without producing strains upon the cloth.

Having described my invention, I claim and desire to secure by Letters Patent the following:

1. The longitudinally-arranged guide-plate adapted to be attached to the breast-beam of a loom, the fulcrum-block mounted on the said guide-plate and grooved to embrace the said guide-plate and having a convex face, and a slotted temple-stand resting upon a portion only of the face of the said fulcrum-block, combined with adjusting-screws operating upon the said stand at opposite sides the center of the said fulcrum-block, whereby the temple-stand may be adjusted to cause the temple-head carried by it to be moved vertically, as desired, to place the said temple-head in proper position with relation to the cloth-making point, substantially as described.

2. The breast-beam, the longitudinally-arranged guide-plate mounted thereon and connected thereto by screws having their heads countersunk into the said guide-plate, the fulcrum-block grooved transversely at its under side to embrace the said track and having its upper side convex, combined with a substantially straight slotted temple-receiving stand and with adjusting-screws E F and clamping-screws H, to operate substantially as described.

3. The fulcrum-block C, having a convexed face, combined with a slotted temple-stand having a straight under side and mounted upon the said convexed face and with devices to tilt the said stand upon the said convexed face, whereby the said temple-stand is capable of vertical adjustment at its end next the reed, as and for the purposes set forth.

In testimony whereof I have signed my name to this specification in the presence of two subscribing witnesses.

LEWIS F. BROUS.

Witnesses:
GEO. W. GREGORY,
EMMA J. BENNETT.